W. H. RONEY.
APPARATUS FOR DISTRIBUTING GRAIN.
APPLICATION FILED SEPT. 29, 1913.
1,149,221.
Patented Aug. 10, 1915.
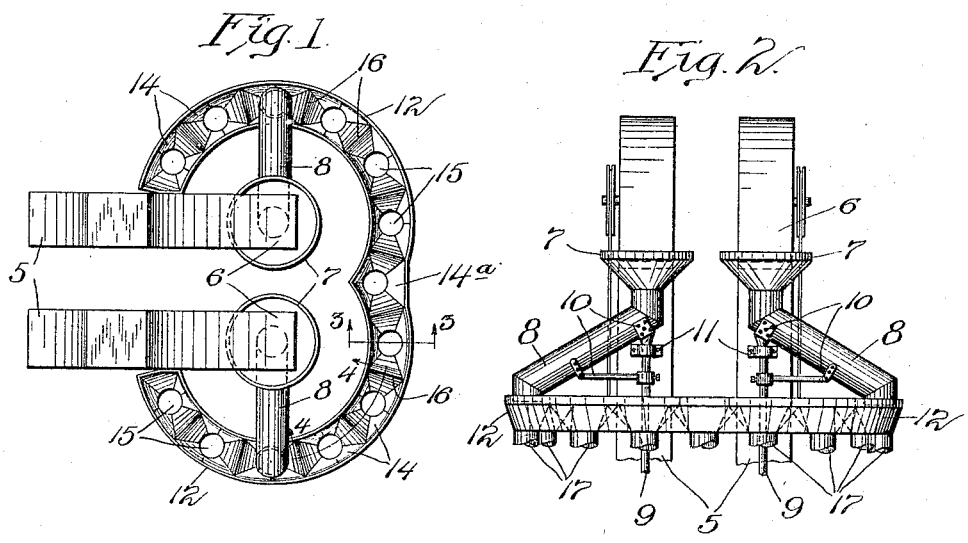
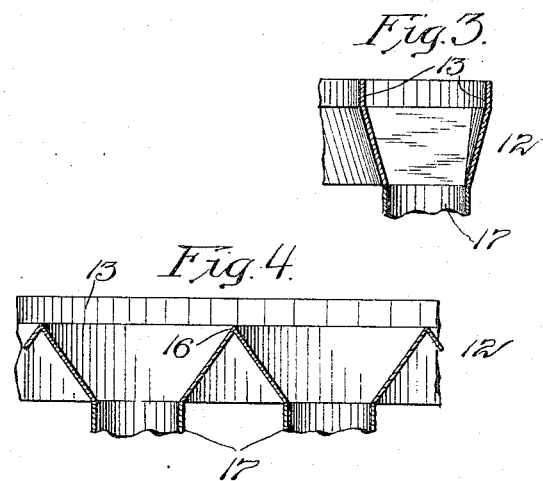
Witnesses:
Arthur Haegg.
C. Paul Parker
Inventor.
William H. Roney.
By Luther L. Miller
Attorney

UNITED STATES PATENT OFFICE.

WILLIAM H. RONEY, OF GARY, INDIANA.

APPARATUS FOR DISTRIBUTING GRAIN.

1,149,221.  Specification of Letters Patent.  Patented Aug. 10, 1915.

Application filed September 29, 1913.  Serial No. 792,271.

*To all whom it may concern:*

Be it known that I, WILLIAM H. RONEY, a citizen of the United States, residing at Gary, in the county of Lake and State of Indiana, have invented certain new and useful Improvements in Apparatus for Distributing Grain, of which the following is a specification.

The object of this invention, generally speaking, is to provide an apparatus by which grain may be effectively distributed without any spilling or wasting of the grain.

Another object is to provide a trough of improved construction, which forms a part of the grain distributing apparatus.

In the accompanying drawings, Figure 1 is a plan view, with parts broken away, illustrating an apparatus embodying the features of my invention. Fig. 2 is a fragmental side elevation of the apparatus. Fig. 3 is a transverse section through the distributing trough taken in the plane of line 3 3 of Fig. 1. Fig. 4 is a section of the trough on the curved line 4 4 of Fig. 1.

In the illustrative embodiment of my invention, which is shown in the drawing, there is provided a pair of elevator legs 5, of any common or preferred construction, adapted to elevate grain from a suitable source and discharge the grain through spouts 6 into a pair of hoppers 7. A spout 8 leads from each of the hoppers 7 and has its lower end overlying and extending a short distance into a distributing trough, which will presently be described. The hoppers 7 and spouts 8 are mounted upon and rotate with vertical shafts 9, being secured upon said shafts by suitable fastening devices 10. The upper ends of the shafts may be mounted in bearings 11 carried by the elevator legs 5.

The two sets of devices consisting of the elevator legs 5, hoppers 7, spouts 8, and their supporting devices, may be substantially identical in structure. The trough 12 which receives grain from the spouts 8 has a configuration resembling in plan view a figure 3, as indicated in Fig. 1. Each end portion of this trough 12 is formed upon the arc of a circle, the center of which is the axis of the adjacent shaft 9. As one of the shafts 9 is rotated, the lower end of the spout 8 carried thereby describes an arc above the corresponding portion of the trough 12. Without departing from the scope of my invention, one of the elevator legs 5 and its corresponding hopper 7, spout 8, and the associated portion of the trough 12, might be omitted.

The trough 12 is of somewhat peculiar construction, and comprises a pair of sides 13 and walls extending between the sides and forming a plurality of separate hopper-like compartments 14 having openings 15 at their bottom. The side walls of each compartment 14 converge downwardly to the outlet opening 15. The adjacent end walls of two adjacent hoppers converge upwardly with respect to each other and form a ridge 16 in the trough between each two adjacent outlet openings 15. In the middle portion of the trough is a compartment 14ᵃ which is so positioned as to receive grain from either one of the spouts 8.

Preferably the lower end of each of the spouts 8 extends downwardly a short distance below the upper edges of the trough sides 13, so that spilling of the grain is prevented. The ridges 16 between the respective hoppers insure that the grain discharged from the spouts 8 will pass into one or another of the outlet openings 15. The upper edges of the sides 13 lie in a plane above the ridges 16 and preferably above the lower end of the spouts 8.

A series of conduits 17 is secured to the trough 12 in line with the respective discharge openings 15, said conduits being arranged to convey the grain from the trough 12 to any desired points.

The shaft 9 may be located by the operator to position the spout 8 above the particular compartment in the trough to which it is desired to deliver the grain.

While I have herein shown and described in detail one embodiment of my invention, I would have it understood that I do not thereby intend to limit the invention to the construction disclosed, except in so far as is pointed out in the appended claims.

I claim as my invention:

1. In a grain-distributing apparatus, the combination of a receiving trough, a pair of rotary hoppers, a pair of spouts leading from and rotating with said hoppers, said trough comprising two arcuate portions each positioned concentric with one of said rotary hoppers, each portion of said trough having a plurality of compartments adapted to receive grain from one of said spouts, depending upon the position of the spout, and the trough having a compartment adapted and positioned so as to receive grain from either one of said spouts.

2. In a grain-distributing apparatus, the combination of a trough comprising a plurality of hoppers arranged close together in a single row on the arc of a circle, side walls positioned at opposite sides of said row of hoppers, the upper edges of said walls lying in a plane above the upper ends of the hoppers, and an inclined discharge spout pivoted on a vertical axis at the center of the arc and having its lower end provided with a vertical portion lying above said trough and extending to a plane below the plane of the upper edges of said side wall.

In testimony whereof I affix my signature in presence of two witnesses.

WILLIAM H. RONEY.

Witnesses:
WILLIAM C. GEAKE,
DELLA CRONKHITE.

Copies of this patent may be obtained for five cents each, by addressing the "Commissioner of Patents, Washington, D. C."